United States Patent [19]

Nishimura

[11] 3,999,298
[45] Dec. 28, 1976

[54] WATCH WITH DISTANCE MEASURE

[75] Inventor: Tomeo Nishimura, Suwa, Japan

[73] Assignee: Kabushiki Kaisha Suwa Seikosha, Tokyo, Japan

[22] Filed: Jan. 14, 1975

[21] Appl. No.: 541,028

Related U.S. Application Data

[63] Continuation-in-part of Ser. No. 314,905, Dec. 13, 1972, abandoned.

[52] U.S. Cl. .............................. 33/141 R; 58/91; 58/152 R
[51] Int. Cl.² ................. G01B 3/12; G04B 39/00
[58] Field of Search ............... 33/141, 141.5, 142; 58/152 R, 91

[56] References Cited
UNITED STATES PATENTS

| | | | |
|---|---|---|---|
| 1,433,640 | 10/1922 | Morneau | 33/141 R |
| 1,942,130 | 1/1934 | Woodcock | 33/141 R |
| 2,421,581 | 6/1947 | Scott | 33/141 R |
| 3,319,415 | 5/1967 | Von Aesch et al. | 58/73 |
| 3,548,588 | 12/1970 | Piquerez | 58/91 |
| 3,665,701 | 5/1972 | Burdet | 58/91 |

Primary Examiner—Richard E. Aegerter
Assistant Examiner—John W. Shepperd
Attorney, Agent, or Firm—Blum, Moscovitz, Friedman & Kaplan

[57] ABSTRACT

A measuring instrument for rotatively measuring point to point distances in operative combination with a watch is provided. The measuring instrument comprises a wheel rotatably connected to the watch and having a discrete, continuous, rotative edge which is displaceable against a measuring surface. A driving gear is coaxial and operatively connected with the wheel for simultaneous rotation therewith. A driven gear mounted in the watch casing is cooperatively connected to the driving gear and the axis of said driven gear is perpendicular to the axis of said driving gear. Externally visible graduations are provided on the driven gear for indicating a point to point distance. The rotative displacement of the discrete, continuous edge of the wheel is translated into a distance measure according to rotative displacement of the graduations located on the driven gear.

11 Claims, 7 Drawing Figures

WATCH WITH DISTANCE MEASURE

CROSS-REFERENCE TO RELATED APPLICATION

This is a continuation-in-part application of pending prior application Ser. No. 314,905 for Watch With Distance Measure, filed Dec. 13, 1972 and now abandoned.

BACKGROUND OF THE INVENTION

The present invention relates to a measuring instrument for rotatively measuring point-to-point distances, said measuring instrument being adapted for inclusion in a conventional watch.

Discrete measuring instruments of the type which may be rolled along a map for determining distances between fixed points are known. While these conventional instruments are useful, they are bulky, generally delicate, and are unlikely to be carried around unless intended for use.

Therefore, it is desirable to provide a compact, impact resistant measuring device which is adapted for inclusion in a commonly and conveniently carried device, such as a watch. Accordingly, the instant invention provides a measuring instrument which is particularly adapted for inclusion within a watch, without impairing the time keeping function of the watch and without increasing the bulk or weight thereof.

SUMMARY OF THE INVENTION

Generally speaking, in accordance with the invention, a measuring instrument for rotatively measuring point to point distances in operative combination with a watch is provided. The measuring instrument includes a wheel rotatably connected to the watch and the wheel is provided with a discrete, continuous, rotative edge. Operatively connected to the wheel is a coaxial driving gear for simultaneous rotation therewith. Cooperatively connected to the driving gear is an annular driven gear having an axis perpendicular to that of said driving gear.

Externally visible graduations are provided on the driven gear for indicating a point-to-point distance. Rotative displacement of the discrete, continuous edge of the wheel is translated into a distance measure according to rotative displacement of the graduations located on the driven gear.

Accordingly, an object of the instant invention is to provide a novel measuring instrument for calculating point-to-point distance measurements.

A further object of the instant invention is to provide a novel measuring instrument which is particularly adapted for inclusion in a watch.

Another object of the present invention is to provide a watch having a distance measuring device included therein.

Still another object of the invention is to provide a compact, lightweight, impact resistant measuring instrument for inclusion in a watch.

Still other objects and advantages of the invention will in part be obvious and will in part be apparent from the specification.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
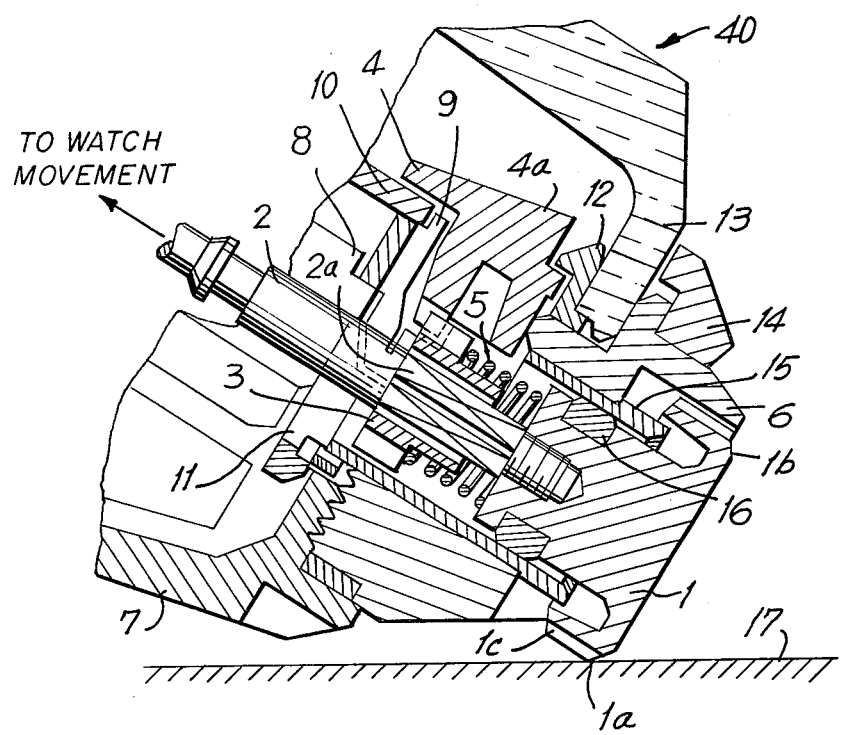
FIG. 1 is a partial cross-sectional view of a watch wherein the crown may be used for measuring distance by rolling same along a surface.
Figure 2:
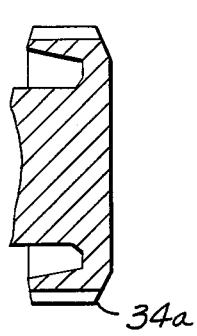
FIGS. 2–5 are cross-sectional views of several wheels that may be used in connection with the FIG. 1 embodiment for taking a point point distance measure.
Figure 3:
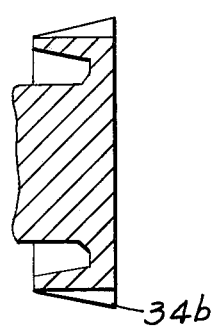
Figure 4:
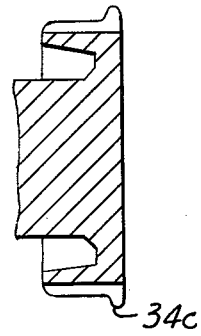
Figure 5:
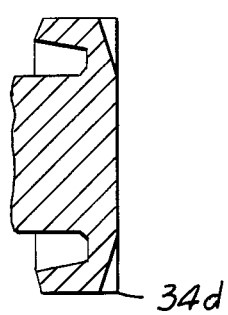

Referring now to the drawings, and particularly to FIG. 1 thereof, a watch generally designated by the numeral 40 includes a crown 1 having continuous edge 1a determined by a bevel 1b in the crown. Crown 1 may be rotated between fixed points on a surface 17, as by rolling crown 1 along edge 1a thereof between fixed points on surface 17. Edge 1a of the crown is engaged against surface 17 and rolled thereon between the fixed points for thereby rotating crown 1 whereby a distance between the fixed points may be registered according to a predetermined scale.

Crown 1 is of otherwise conventional construction in the sense that it is provided with plural positions for respectively winding watch 40, adjusting the timesetting displayed thereon, and adjusting day and date settings if the watch is of the calendar type. To adapt this embodiment to include the distance measure device, crown 1 is provided with an additional axial setting so as to operatively connect crown 1 with the distance registration means.

Figure 7:
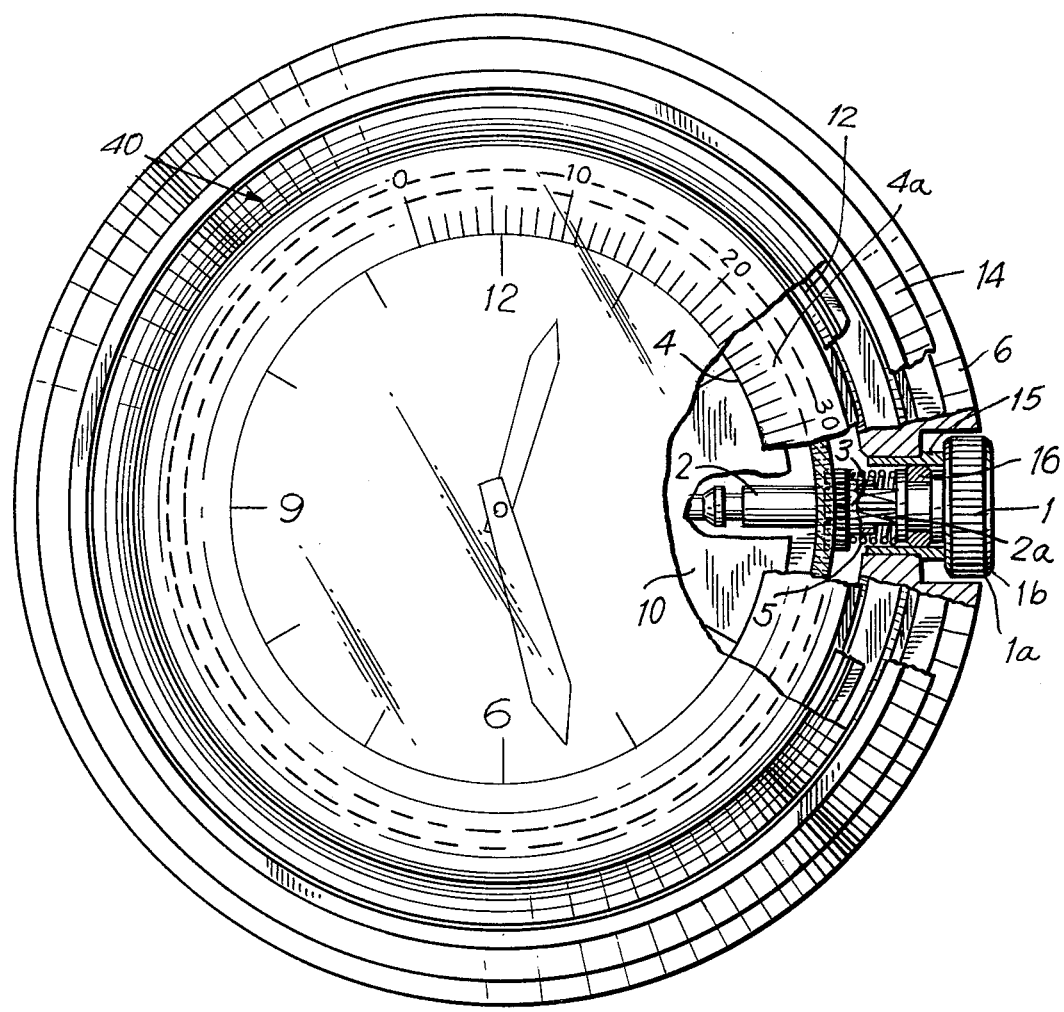
FIG. 7 is a partially-broken away plan view showing the operative orientation of members of the measuring instrument.

Connected to crown 1 is an axially displaceable stem 2 on which crown 1 may be adjusted to its plural settings to accomplish the aforementioned functions. As seen in FIGS. 1 and 7 crown 1 is adjusted on stem 2 to the distance measure setting. At the setting, a plurality of splines 2a provided on stem 2 meshingly engage a driving gear 3 which is rotatably mounted in the watch casing. Driving gear 3, in turn, meshingly engages a driven gear 4 which is provided with a plurality of graduations, to scale, on face 4a thereof. Face 4a, therefore, has thereon a distance scale which is visible through a watch crystal 13, mounted on the watch casing. The extent of rotation of dial 4a as determined by the rotative displacement of edge 1a of crown 1 through cooperative gearing 3,4 is therefore translated to a distance measure, the extent of rotation being measured against any arbitrarily selected reference point such as an hour-mark on the watch dial 10.

To maintain a 1:1 rotation ratio between stem 2 and driving gear 3, a helical spring 5 biases driving gear 3 against splines 2a. Spring 5 overfits a collar portion provided on driving gear 3, without interfering with the gear teeth thereof, for biasing driving gear 3 against splines 2a. As seen in FIG. 1 watch 40 includes a casing comprising a back cover 7, a case band 6, a casing ring 11, a tension ring 12, a bezel 14, and a tube 15, within which crown 1 is slideable on stem 2. A packing 16 is mounted around crown 1 for providing a seal between crown 1 and tube 15. Mounted within the watch casing is a watch movement 8, a holding ring 9, and a watch dial 10.

It is preferred that the distance measure setting for winding crown 1 be at its innermost axial position. In other words, the axial setting for winding crown 1 on stem 2 should be the setting position most proximate the watch casing whereby edge 1a of crown 1 may be rolled on surface 17 without sliding thereof.

The measuring wheel which translates rotation into a distance measurement as seen in FIG. 1 is a crown 1 which is provided with a well defined rotatable edge 1a. As seen in FIG. 1, edge 1a has a circular profile which corresponds to the intersection of frusto-conical surface 1b and cylindrical knurled surface 1c. Therefore, edge 1a corresponds to a maximum periphery of crown 1.

Referring now to FIGS. 2-5, respective edges 34a, 34b, 34c, and 34d provided in the measuring wheels respectively shown therein are well defined, maximum peripheries of each respective wheel in which each respective edge is formed. When the measuring wheels as seen in FIGS. 2-5 are employed as watch crowns in the manner seen in FIG. 1, each may be suitably manually manipulated to the various crown settings, while each is also suitably constructed for taking a rolling distance measurement.

Figure 6:
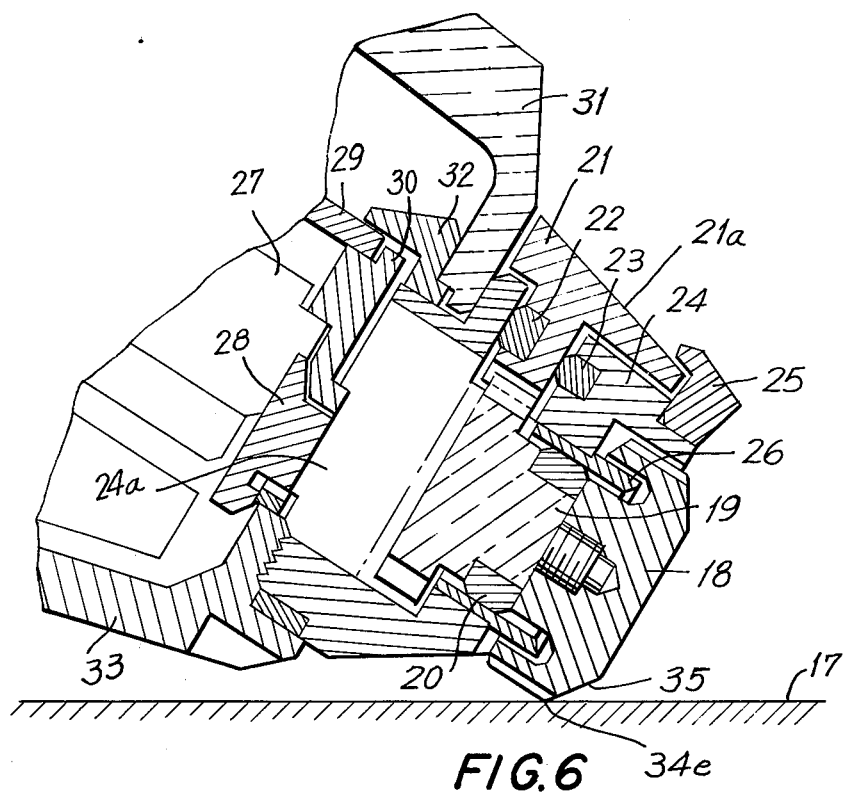
FIG. 6 is a partial cross-sectional view of another embodiment within the scope of the instant invention.

In the embodiment of the device seen in FIG. 1, the measuring wheel is watch crown 1. However, a measuring wheel may be discretely mounted in the watch casing independently of the watch crown, in operative combination with cooperative gearing of the type seen in FIG. 1. Referring now to FIG. 6, rotation of a measuring wheel 18 along a surface 17 is translated into a distance measure through cooperative gearing 19, 21. Wheel 18 may be rotated between fixed points on surface 17, as by rolling wheel 18 along an edge 34e thereof. Continuous edge 34e is determined by a bevel 35 in wheel 18. A driving gear 19 is fixedly operatively connected to wheel 18 for rotation therewith. A driven gear 21 is cooperatively connected to driving gear 19 whereby rotation of wheel 18 is translated to driven gear 21 through driving gear 19.

A surface 21a of driven gear 21 is provided with graduations of the same type included on surface 4a of driven gear 4. Wheel 18 is rotatably housed within a tubular mounting 26. A packing 20 mounted on a shoulder provided in driving gear 19 seals the wheel housing.

As seen in FIG. 6, the watch includes a casing comprising a case band 24, a holding ring 25 for the measuring device, a casing ring 28, a watch crystal 31, and a back cover 33. Mounted in the watch casing is a watch movement 27, a watch dial 29, a holding ring 30 for dial 29, and tension ring 32 overlying dial 29. In particular, holding ring 25 secures the placement of driven gear 21. A pair of packings 22 and 23 respectively seal the respective interior surfaces of driven gear 21. Packing 23 is mounted in case band 24, while packing 22 is flush mounted in an interior surface of driven gear 21.

Where it is desired to replace or assemble driving gear 19 from within the watch casing, a slot 24a must be provided in case band 24. If slot 24a is enlarged beyond the outer diameter of driving gear 19, then driving gear 19 may be mounted in its housing from the exterior of the watch, and thereafter tube 26 may be mounted over the slot and wheel 18 may be threaded onto the screw shaft provided on gear 19.

Referring now to FIGS. 1 and 6, gears 4 and 21 are of substantially annular shape to maximize visibility of the watch dial through respective crystals 13 and 31. As seen with particular reference to FIG. 7, gearing 3 and 19 are spur gears which cooperate with respective crown gears 4 and 21, such gears also being termed "face gears". Annular gear 4 is positioned in the axial direction by dial 10 and tension ring 12, and diametrally either by holding ring 9 or tension ring 12. Gear 21 is positioned axially by case band 24 and holding ring 25 and diametrally by packings 22 and 23. FIG. 7 is generally exemplary of the operative relationship among members of the measuring device.

With reference to the embodiments seen in FIGS. 1 and 6, it may be seen that the measuring device may function independently of the watch in which it is included, or alternatively, the measuring instrument may be operatively related to usual watch functions. Additionally, it may be seen that the measuring instrument may be independently housed on the watch casing, or alternatively, provision therefor may be made within the watch casing itself.

It will thus be seen that the objects set forth above, among those made apparent from the preceeding description, are efficiently attained, and since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A watch in combination with a measuring instrument for measuring point-to-point distances on a map, comprising a watch casing, a watch movement therein having a stem, a wheel rotatably connected to said watch stem and having a discrete continuous, rotative edge, a driving gear rotatably mounted in said watch casing, said driving gear being coaxial with said wheel, coupling means on said stem for selectively coupling said stem with said driving gear for simultaneous rotation therewith, said stem being axially movable for operating said driving gear in one position and said watch movement in at least one other position and an annular driven gear rotatably mounted in said watch casing, said driven gear being cooperatively connected to said driving gear and having an axis perpendicular to that of said driving gear, said driven gear including externally visible graduations thereon for indicating a point-to-point distance, said rotative displacement of said discrete, continuous edge of said wheel being translated into a distance measure according to rotative displacement of said graduations on said driven gear relative to an arbitrarily-selected fixed point.

2. The measuring instrument as claimed in claim 1, wherein said driven gear is a crown gear.

3. The measuring instrument as claimed in claim 1, wherein said driving gear is a spur gear.

4. The measuring instrument as claimed in claim 1, said wheel comprising a watch crown, said driving gear comprising a spur gear, and said operative connection therebetween comprising an axial stem having an end fixedly connected to said watch crown.

5. The measuring instrument as claimed in claim 1, wherein said wheel is a watch crown, and further including an axial stem engaged with said watch crown for rotation therewith, said crown being axially positionable to a plurality of positions on said axial stem, in a first position said crown being releasably engageable with said driving gear for thereby rotatively displacing said driving gear whereby said driven gear and said graduations thereon are concomitantly displaced.

6. The measuring instrument as claimed in claim 5, said stem including a plurality of splines, said splines releasably egaging said driving gear in said first position of said watch crown, and means for releasably biasing said driving gear into abutment with said splines.

7. The measuring instrument as claimed in claim 1, wherein said wheel has a maximum periphery corresponding to a determined continuous edge thereof, said continuous edge being engageable with a surface on which a piont-to-point measurement is to be taken.

8. The measuring instrument as claimed in claim 1, including a tubular housing for said wheel, said wheel including a hub portion and a packing mounted in said hub portion of said wheel for sealing said wheel housing.

9. The measuring instrument as claimed in claim 1, wherein said driving gear is threadably connected to said wheel and meshingly engages said driven gear.

10. The measuring instrument as claimed in claim 1, wherein said watch includes a crystal and said driven gear is interior to said crystal.

11. The measuring instrument as claimed in claim 1, wherein said watch includes a crystal and said driven gear is exterior to said crystal.

* * * * *